(12) United States Patent
Cassway et al.

(10) Patent No.: US 8,813,978 B2
(45) Date of Patent: Aug. 26, 2014

(54) MATERIAL SUPPORTING LEDGE

(76) Inventors: Rustin A. Cassway, Cherry Hill, NJ (US); Nicholas X. Damiani, Clayton, NJ (US); Michael F. Frett, Magnolia, NJ (US)

(*) Notice: Subject to any disclaimer, the term of this patent is extended or adjusted under 35 U.S.C. 154(b) by 117 days.

(21) Appl. No.: 13/530,180

(22) Filed: Jun. 22, 2012

(65) Prior Publication Data

US 2013/0213914 A1 Aug. 22, 2013

Related U.S. Application Data

(60) Provisional application No. 61/601,738, filed on Feb. 22, 2012.

(51) Int. Cl.
*A47G 19/08* (2006.01)

(52) U.S. Cl.
USPC .................... 211/41.1; 211/41.14; 211/86.01; 211/87.01

(58) Field of Classification Search
USPC ............ 211/41.1, 41.14–41.16, 86.01, 87.01, 211/88.01, 90.01, 94.01, 106.01, 134, 153, 211/13, 3.3, 189, 193, 59.3; 410/144; 248/235, 239, 241, 250
See application file for complete search history.

(56) References Cited

U.S. PATENT DOCUMENTS

| | | | | |
|---|---|---|---|---|
| 5,486,046 A | * | 1/1996 | Jernstrom et al. | 312/408 |
| 5,673,801 A | * | 10/1997 | Markson | 211/59.3 |
| 5,807,047 A | * | 9/1998 | Cox | 410/152 |
| 5,855,283 A | * | 1/1999 | Johnson | 211/59.3 |
| 5,970,887 A | * | 10/1999 | Hardy | 108/108 |
| 6,364,136 B1 | * | 4/2002 | Weshler et al. | 211/90.02 |
| 6,364,141 B1 | * | 4/2002 | Ehrgott | 211/189 |
| 6,675,980 B2 | * | 1/2004 | Ehrgott | 211/189 |
| 7,954,648 B2 | * | 6/2011 | Takashima et al. | 211/59.3 |

* cited by examiner

*Primary Examiner* — Korie H Chan
(74) *Attorney, Agent, or Firm* — Stuart M. Goldstein

(57) ABSTRACT

A material supporting ledge is configured to be attached to a horizontal rail support. The ledge has a support bracket with a central section with dual arm members for securing the ledge onto a horizontal rail or an arm extension member which is inserted into one of the openings in an e-track rail. The bracket also has two downwardly extending framing elements connected to two platform elements on which support blocks are positioned. The ledge can be secured onto the rail and is quickly mountable to and removeable from the rail without the use of tools. Upon the placement of the ledge on the rail, the ledge is securely maintained in position against rail. Material, including glass plates of varying sizes, can be placed on the ledge, over larger glass plates already being carried in the system.

11 Claims, 5 Drawing Sheets

MATERIAL SUPPORTING LEDGE

This application claims the benefit of application Ser. No. 61/601,738, filed on Feb. 22, 2012.

BACKGROUND OF THE INVENTION

Horizontal rail support systems, including e-track systems, are utilized in a variety of different applications, but they are especially useful for securing and maintaining cargo in and on trucks, trailers, and other vehicles which transport products and materials. Plate glass carriers which are mounted on trucks commonly use rail securing systems with tie down devices to carry plate glass and like products, since they provide a secure means of ensuring for the safety of these breakable products. However, the product carrying capacity of such rail systems, including e-track systems, especially while transporting plate glass of varying sizes and configurations, is currently limited. Transporting a large number of different sized plate glass on a single vehicle, safely and securely, presents a challenge.

SUMMARY OF THE INVENTION

It is thus the object of the present invention to provide a unique material supporting ledge which, when used in conjunction with a horizontal rail support, allows for more options in securing materials, including glass plates of varying sizes, during transport of such materials. In so doing, the material carrying capacity of the system is increased and its load maximized.

These and other objects are accomplished by the present invention, a material supporting ledge configured to be attached to a horizontal rail support system. The ledge comprises a support bracket having a central section with dual arm members for removeably securing the ledge onto a horizontal rail or an arm extension member which is inserted into one of the openings in a horizontal e-track rail. The bracket also has two downwardly extending framing elements connected to two platform elements on which support blocks are positioned. The ledge is designed to be secured onto the rail and is quickly mountable to and removeable from the rail without the use of tools. Upon the placement of the ledge on the rail and the application of weight on the support blocks, the ledge is securely maintained in position against rail. Material, including glass plates of varying sizes, can be placed on the ledge, over larger glass plates already being carried in the system.

The novel features which are considered as characteristic of the invention are set forth in particular in the appended claims. The invention, itself, however, both as to its design, construction and use, together with additional features and advantages thereof, are best understood upon review of the following detailed description with reference to the accompanying drawings.

DETAILED DESCRIPTION OF THE INVENTION

Figure 1:
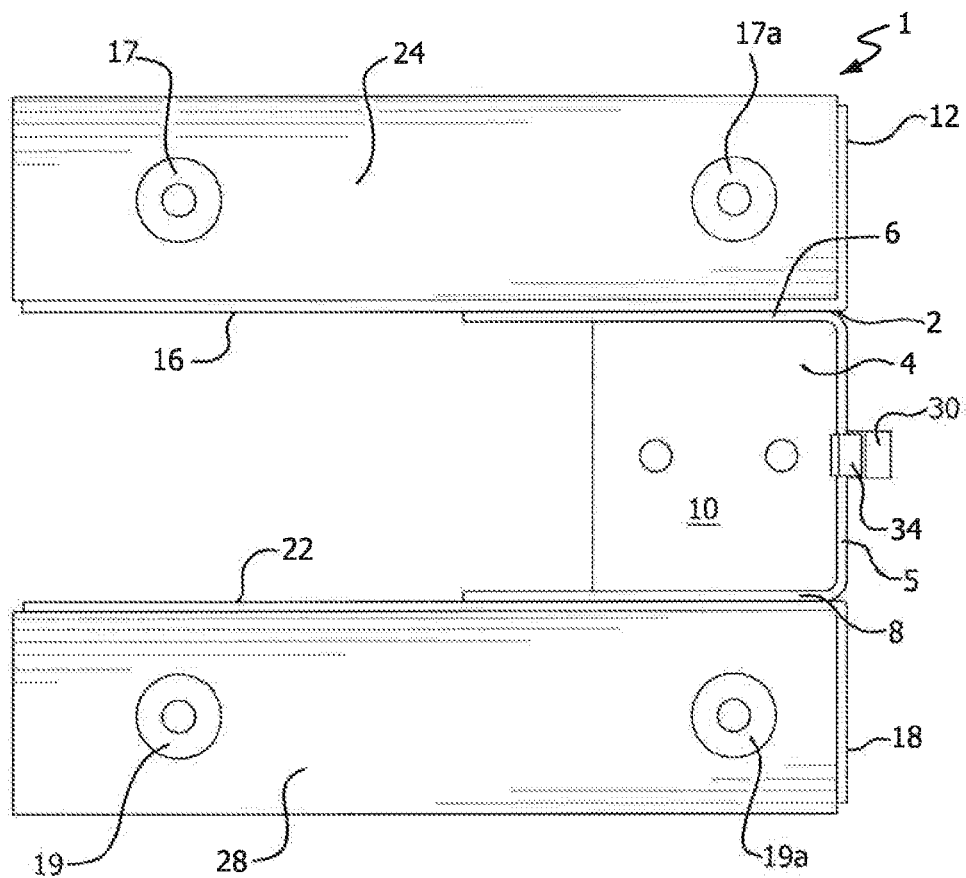
FIG. 1 is a top view of one embodiment of the present invention.
Figure 2:
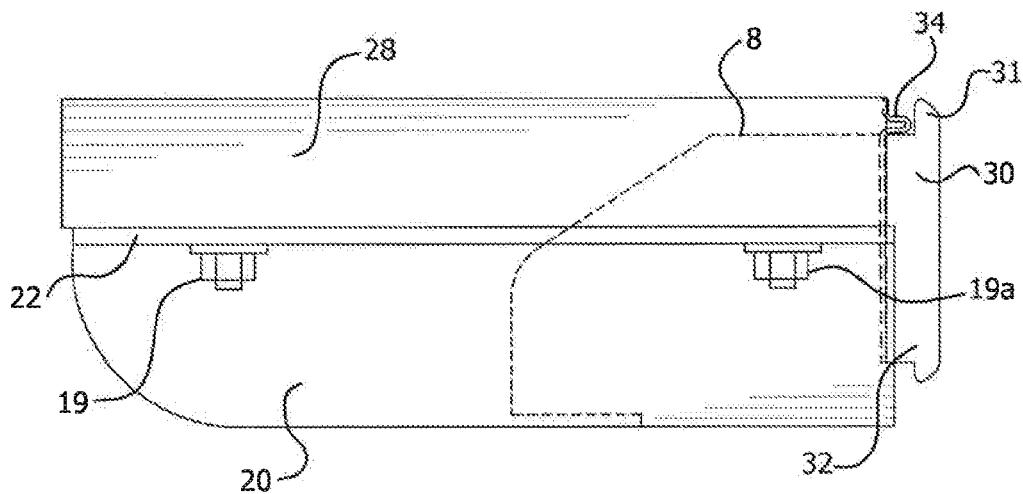
FIG. 2 is an elevation view of the embodiment in FIG. 1.
Figure 3:
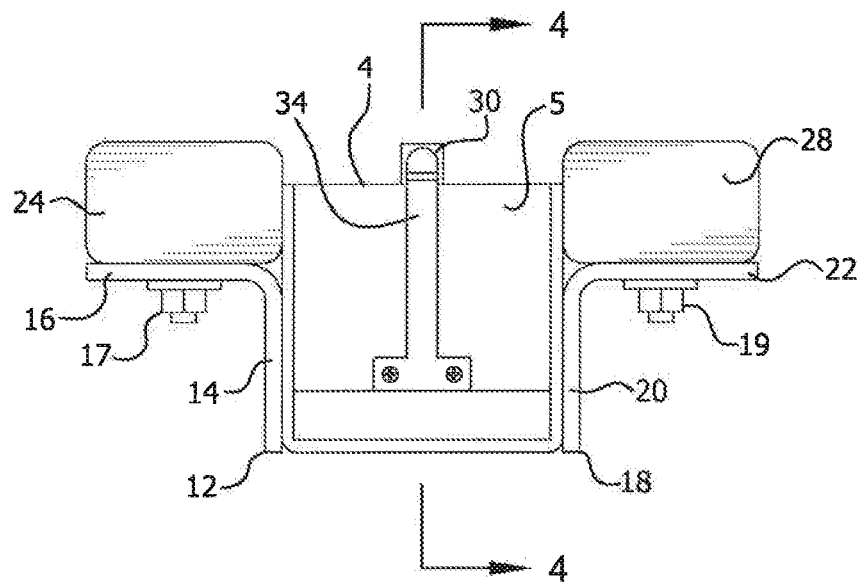
FIG. 3 is a front view of the embodiment in FIG. 1.
Figure 4:
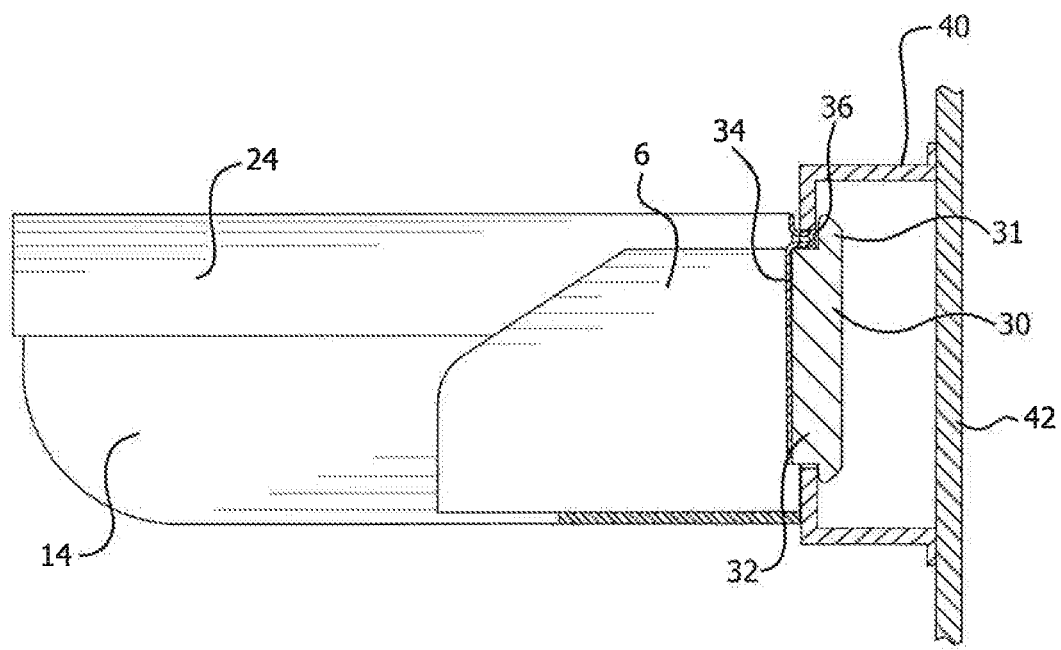
FIG. 4 is a cross-sectional view taken from FIG. 3, with the first embodiment attached to an e-track.

FIGS. 1-4 show a first embodiment of the invention. Material supporting ledge 1 comprises support bracket 2 having central section 4 with back wall 5 and side walls 6 and 8 framing cavity 10. Bracket 2 also comprises lateral sections 12 and 18 attached to central section 4. Lateral section 12 has downwardly extending framing element 14 and platform element 16 extending laterally and perpendicularly from the framing element and central section 4. Lateral section 18 has downwardly extending framing element 20 and platform element 22 extending laterally and perpendicularly from the framing element and central section 4.

Support component 24 is positioned on and is secured to platform element 16 by bolt and nut unit 17 and 17a and support component 28 is positioned on and is secured to platform element 22 by bolt and nut unit 19 and 19a. Support components 24 and 28 are optimally solid blocks made of a rubber or steel material.

Arm extension member 30 extends from the rear surface of back wall 5 of central section 4. Arm member 30 comprises rear section 31 and notched section 32. Biased attachment clip 34 is secured to the front surface of back wall 5. Arm member 30 is sized to be inserted into opening 36 within e-track 40, such that notched section 32 of the arm member is within the opening, held in place by clip 34. E-track 40, itself, is secured to a rail 42 of a glass carrier vehicle.

In use, rear section 31 of arm member 30 is simply inserted into opening 36 of e-track 40 on glass carrier vehicle 60, as has just been described. When weight is applied on support components 24 and 28, the forward section of framing elements 14 and 20 are compelled down and the rearward sections are compelled towards and into opening 36 of e-track 40, as are the support components, whose aft ends are slightly raised by the applied weight. Ledge 1 is thusly maintained securely in place against the e-track.

Figure 5:
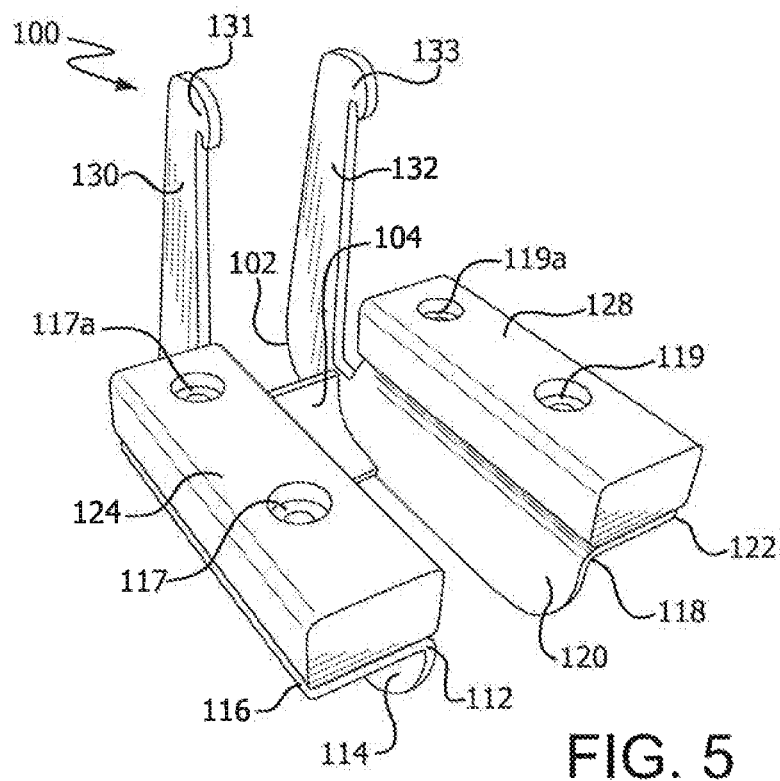
FIG. 5 is a front perspective view of a second embodiment of the present invention.
Figure 6:
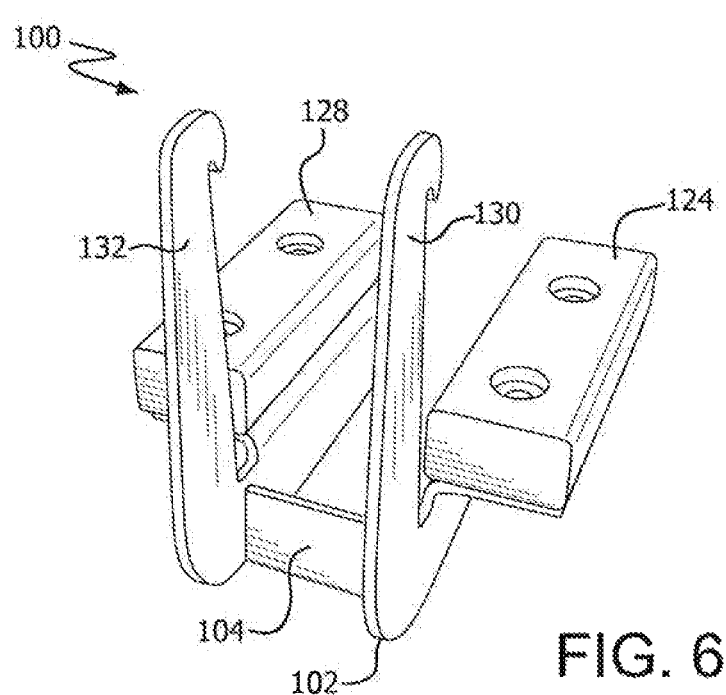
FIG. 6 is a rear perspective view of the second embodiment of the present invention.

FIGS. 5 and 6 show a second embodiment of the invention. Material supporting ledge 100 comprises support bracket 102 having central section 104 and lateral sections 112 and 118 attached to the central section. Lateral section 112 has downwardly extending framing element 114 and platform element 116 extending laterally and perpendicularly from the framing element and central section 104. Lateral section 118 has downwardly extending framing element 120 and platform element 122 extending laterally and perpendicularly from the framing element and central section 104.

Support component 124 is positioned on and is secured to platform element 114 and support component 128 is positioned on and is secured to platform element 118. As with the first embodiment, support components 124 and 128 are secured by bolt units 117 and 117a and 119 and 119a and are optimally solid blocks made of a rubber or steel material.

Dual arm members 130 and 132 extend upward from central section 104. Arm members 130 and 132 comprise upper hook components 131 and 133, configured to secure ledge 100 to e-track rail 40 or other horizontal rail 50.

Figure 7:
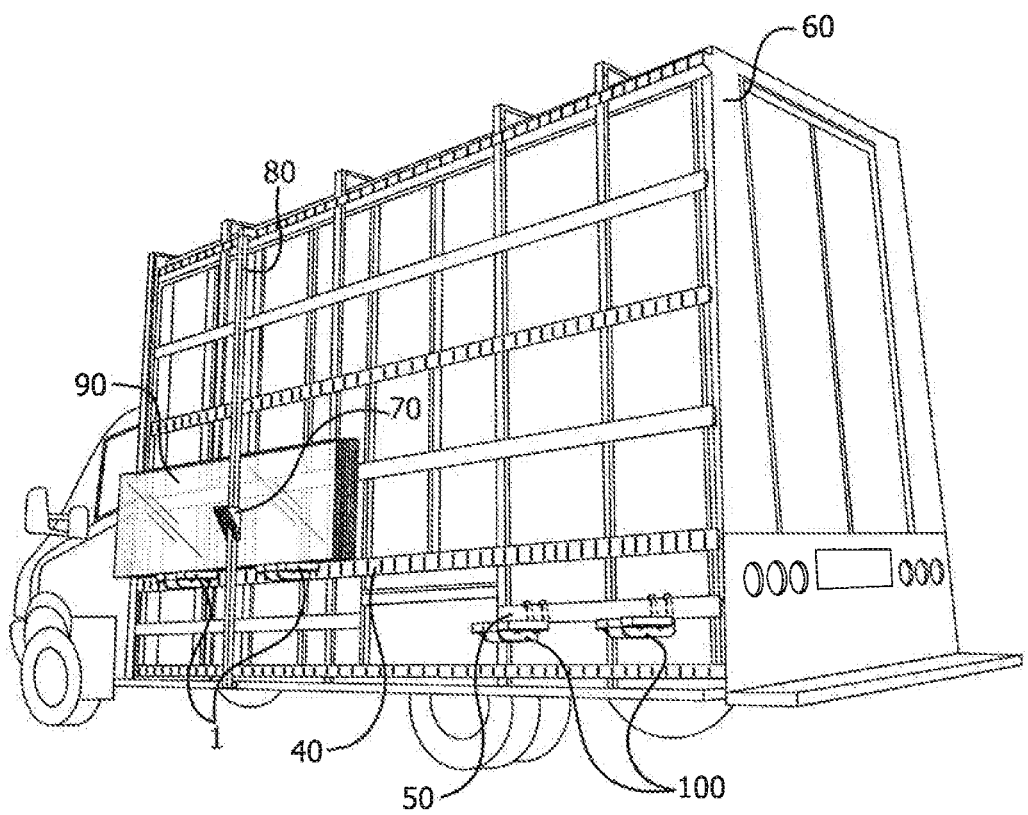
FIG. 7 is a view of both embodiments of the present invention mounted on a glass carrier vehicle.
Figure 8:
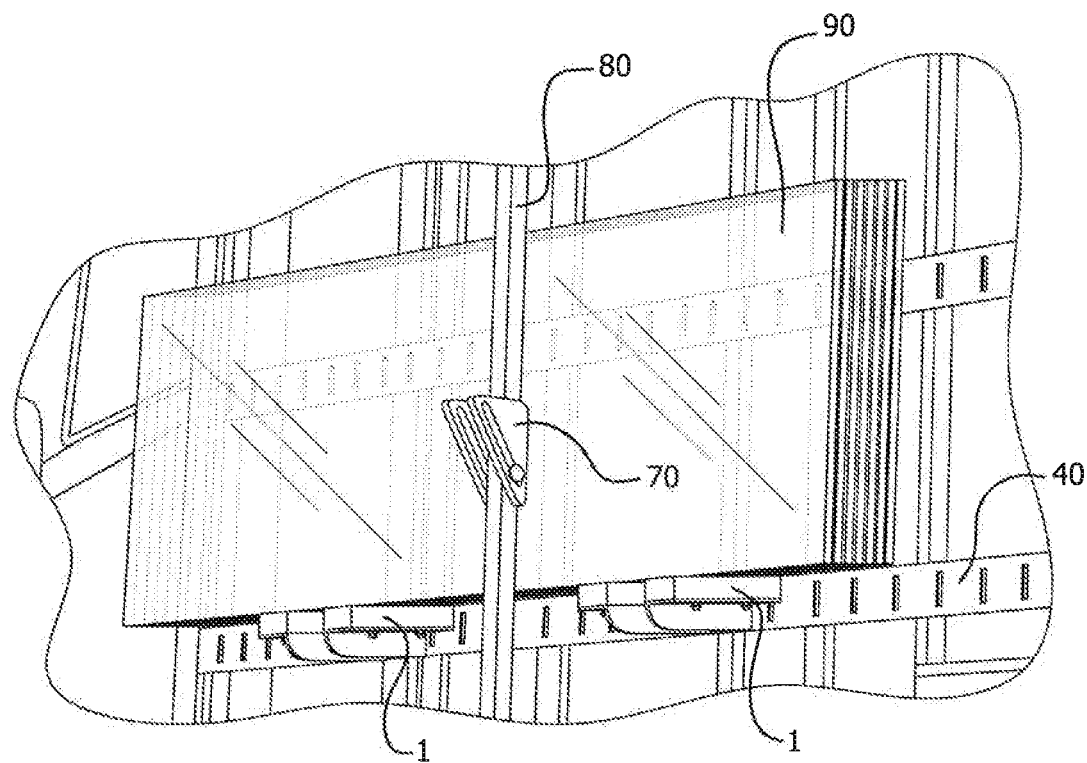
FIG. 8 is a close-up view of the first embodiment of the present invention mounted on a glass carrier vehicle.
Figure 9:
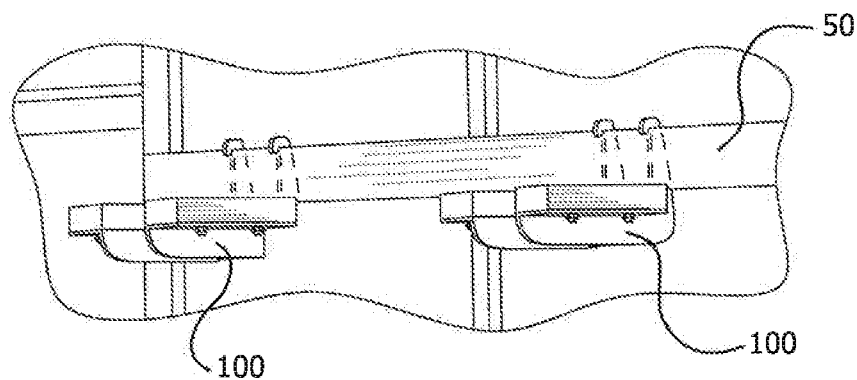
FIG. 9 is a close-up view of the second embodiment of the present invention mounted on a glass carrier.

In use, arm members 130 and 132 are simply positioned over the rear surfaces of e-track rail or other horizontal rail 50, such that the arm members are behind the rail and support components 124 and 128 extend in front of the rail, as shown in FIGS. 7 and 9. As described with regard to the first embodiment, when weight is applied on support components 124 and 128, ledge 100 is compelled against rail 50, in this case by arm members 130 and 132, and their hook components 131 and 133 are forced against the rear surface of the rail.

Ledges 1 and 100 are easily mounted on and removeable from e-track or other horizontal rails, without the use of tools. The ledges can readily be moved from location to location, to maximize load carrying capacity. It is contemplated that multiple ledges would be used, especially for maintaining smaller plates of glass, e.g. 90, along glass carrier vehicles 60. For instance, FIGS. 7 an 8 show ledge 1 supporting glass plates 90 held in place by clamp 70 secured to vertical supporting frame 80. While the ledges are especially adaptable for glass plate transport, they can be used in conjunction with e-tracks in any locale to support a variety of different materials.

Certain novel features and components of this invention are disclosed in detail in order to make the invention clear in at least one form thereof. However, it is to be clearly understood that the invention as disclosed is not necessarily limited to the exact form and details as disclosed, since it is apparent that various modifications and changes may be made without departing from the spirit of the invention.

The invention claimed is:

1. A material supporting ledge to be attached to a horizontal rail, said ledge comprising:
    an integral, unitary support bracket comprising a central section having arm means for removeably securing the ledge onto a horizontal rail, and two lateral sections attached to the central section, each lateral section having a downwardly extending framing element and a platform element extending substantially perpendicularly from the framing element, the central section being secured directly to and extending between the downwardly extending framing elements, and also being located, at least in part, below the platform elements, the arm means being located completely behind the lateral sections; and
    a first support component positioned on one of the platform elements and a second support component positioned on the other platform element, said first and second support components each comprising a solid block immoveably secured to the platform elements whereby upon securing the arm means onto the rail, the ledge is securely maintained in position on the rail.

2. The ledge as in claim 1 wherein the arm means comprise dual arm members extending up from the central section.

3. The ledge as in claim 1 wherein the arm means extend from the rear surface of the central section.

4. The ledge as in claim 1 wherein the framing elements of each lateral section are substantially parallel to each other.

5. The ledge as in claim 1 wherein the platform elements of each lateral section are located in the same transverse plane.

6. The ledge as in claim 4 wherein the platform elements of each lateral section are located in the same transverse plane.

7. A material supporting ledge to be attached to an e-track having aligned openings, said ledge comprising:
    an integral, unitary support bracket comprising a central section having arm means for removeable insertion into an opening in an e-track, and first and second lateral sections, each lateral section having a downwardly extending framing element and a platform element extending substantially perpendicularly from the framing element, the central section being secured directly to and extending between the downwardly extending framing elements and also being located, in part, below the platform elements, the arm means extending from the rear surface of the central section and completely behind the lateral section; and
    a first support component positioned on and secured to one of the platform elements and a second support component positioned on and secured to the other platform element, said first and second support components each comprising a solid block immoveably secured to the platform elements, whereby upon securing the arm means to the e-track, the ledge is securely maintained in position on the e-track.

8. The ledge as in claim 7 wherein the arm means comprises an arm member having a notched section.

9. The ledge as in claim 7 wherein the framing elements of each section are substantially parallel to each other.

10. The ledge as in claim 7 wherein the platform elements ach lateral section are located in the same transverse plane.

11. The ledge as in claim 9 wherein the platform elements of each lateral section are located in the same transverse plane.

* * * * *